United States Patent [19]

Selvey

[11] Patent Number: 4,795,177

[45] Date of Patent: Jan. 3, 1989

[54] BOAT DOLLY

[76] Inventor: Loy N. Selvey, 1261 Accra St., Livermore, Calif. 94550

[21] Appl. No.: 164,956

[22] Filed: Mar. 7, 1988

[51] Int. Cl.4 .............................. B62B 3/02; B62B 3/04
[52] U.S. Cl. ................................ 280/47.13 B; 280/35; 114/344
[58] Field of Search ...................... 280/414.2, 47.13 B, 280/35, 47.2, 47.13 R; 114/344

[56] References Cited

U.S. PATENT DOCUMENTS

| | | | |
|---|---|---|---|
| 2,551,040 | 5/1951 | Newell | 280/47.13 B |
| 2,624,591 | 1/1953 | Choplin | 280/47.13 B |
| 2,970,846 | 2/1961 | Boston | 280/414.2 |
| 3,093,386 | 6/1963 | Case | 280/414.2 |
| 3,337,229 | 8/1967 | Raymond | 114/344 X |
| 3,361,441 | 1/1968 | McRae | 280/414.2 X |
| 3,627,344 | 12/1971 | Rizzuto | 280/35 |
| 4,300,252 | 11/1981 | Montooth | 280/414.2 |
| 4,392,665 | 7/1983 | Miller et al. | 280/414.2 |
| 4,422,665 | 12/1983 | Hinnant | 280/414.2 |

FOREIGN PATENT DOCUMENTS 663706  12/1951  United Kingdom ............... 280/47.2

Primary Examiner—David M. Mitchell
Assistant Examiner—Tamara L. Finlay
Attorney, Agent, or Firm—Jerry T. Kearns

[57] ABSTRACT

A boat dolly utilizes two pairs of transversely mounted wheels to allow a boat to be transported horizontally or in a vertical on edge orientation. One pair of wheels may be selectively attached to either end of the dolly. One pair of wheels are removable for transportation and storage purposes. The dolly is provided with a mounting bracket adapted to engage the outboard motor mount on a boat. The mounting bracket is adjustable, and may be adapted to cooperate with any outboard motor mount, regardless of the angle thereof. The dolly allows a single individual to transport and launch a non-trailered boat.

8 Claims, 2 Drawing Sheets

BOAT DOLLY

BACKGROUND OF THE INVENTION

1. Field of the Invention

The present invention relates to boat dollies, and more particularly pertains to a new and improved boat dolly which utilizes two pairs of transversely mounted wheels to enable a boat to be moved in a horizontal or a vertical on edge position. Conventional boat dollies necessitate the transportation of a boat in a horizontal orientation. Due to the width of the boat, it is extremely difficult to maneuver the boat through narrow doorways and along narrow trails. Additionally, the conventional boat dollies require the use of a relatively large volume of space to enable storage of the boat and the attached dolly. In order to overcome these disadvantages, and to allow a single individual to easily launch a non-trailered boat, the present invention provides a new and improved boat dolly which allows a boat to be selectively transported in a horizontal orientation or in an on edge vertical orientation.

2. Description of the Prior Art

Various types of boat dollies are known in the prior art. A typical example of such a boat dolly is to be found in U.S. Pat. No. 2,970,846, which issued to W. Boston on Feb. 7, 1961. This patent discloses a foldable boat dolly for use in transporting boats in a horizontal orientation. U.S. Pat. No. 3,093,386, which issued to M. Case on June 11, 1963, discloses a collapsible boat dolly with mounting provisions for transporting a collapsible boat. The device is designed for attachment to an outboard motor. U.S. Pat. No. 4,300,252, which issued to G. Montooth on Nov. 17, 1981, discloses a boat dolly for attachment to the bow end of a boat. A wheeled member is arranged to be attached to the bow of a boat and is provided with a hitch so that it can be releasably secured to a towing vehicle. A brake mechanism is provided to prevent rearward rotation of the wheel when desired. The device is also provided with a retractable stern mounted wheel for supporting the rear of the boat. U.S. Pat. 4,392,665, which issued to T. Miller et al on July 12, 1983, discloses a boat dolly for supporting the stern of a boat. The bow of the boat rests on a pair of longitudinally disposed and transversely spaced apart ropes that are tied to the frame of the boat dolly. The bow of the boat is supported and both the boat and boat dolly are propelled by applying manual force to the ropes. The boat dolly includes tranversely adjustable wheels, transversely adjustable transom clamps, vertically adjustable transom clamps, self-adjusting rails and provisions for folding to achieve compact storage. U.S. Pat. No. 4,422,665, which issued to W. Hinnant on Dec. 27, 1983, discloses a boat dolly for transportation and launching of boats by a single individual. If the boat is carried in a vehicle such as a pickup truck or station wagon, the device can be left engaged with the boat during the vehicular transport. Thereafter, the device is used to move the boat to the edge of the water wherein by the pulling of a lanyard, the boat will slide from the device and into the water. Recovery of the boat is achieved by pulling the boat onto the boat dolly, with the weight of the boat holding the boat and dolly in place during transport back to a storage area.

While the above mentioned devices are suited for their intended usage, none of these devices provide a boat dolly with two pairs of transversely mounted wheels for allowing a boat to be selectively transported in a horizontal or a vertical orientation. Additionally, none of the aforesaid boat dollies provide for two pairs of transversely mounted wheels, with provisions for selectively mounting one pair of wheels at either end of the boat dolly. Inasmuch as the art is relatively crowded with respect to these various types of boat dollies, it can be appreciated that there is a continuing need for and interest in improvements to such boat dollies, and in this respect, the present invention addresses this need and interest.

SUMMARY OF THE INVENTION

In view of the foregoing disadvantages inherent in the known type of boat dollies now present in the prior art, the present invention provides an improved boat dolly. As such, the general purpose of the present invention, which will be described subsequently in greater detail, is to provide a new and improved boat dolly which has all the advantages of the prior art boat dollies and none of the disadvantages.

To attain this, a representative embodiment of the concepts of the present invention is illustrated in the drawings and makes use of a boat dolly having two pairs of transversely mounted wheels to allow a boat to be transported horizontally or in a vertical on edge orientation. One pair of wheels may be selectively attached to either end of the dolly and is removable for transportation and storage purposes. The dolly is provided with a mounting bracket adapted to engage the outboard motor mount on a boat. The mounting bracket is adjustable, and may be adapted to cooperate with any outboard motor mount, regardless of the angle thereof. The dolly allows a single individual to transport and launch a non-trailered boat.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved boat dolly which has all the advantages of the prior art boat dollies and none of the disadvantages.

It is another object of the present invention to provide a new and improved boat dolly which may be easily and efficiently manufactured and marketed.

It is a further object of the present invention to provide a new and improved boat dolly which is of a durable and reliable construction.

An even further object of the present invention is to provide a new and improved boat dolly which is susceptible of a low cost of manufacture with regard to both materials and labor, and which accordingly is then susceptible of low prices of sale to the consuming public, thereby making such boat dollies economically available to the buying public.

Still yet another object of the present invention is to provide a new and improved boat dolly which provides in the apparatuses and methods of the prior art some of the advantages thereof, while simultaneously overcoming some of the disadvantages normally associated therewith.

Still another object of the present invention is to provide a new and improved boat dolly which utilizes two pairs of transversely mounted wheels for allowing a boat to be selectively transported and stored in a horizontal or a vertical orientation.

Yet another object of the present invention is to provide a new and improved boat dolly which enables a single individual to transport a boat through narrow doorways and along narrow trails.

Even still another object of the present invention is to provide a new and improved boat dolly with provisions for attachment to the outboard motor mount of a boat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
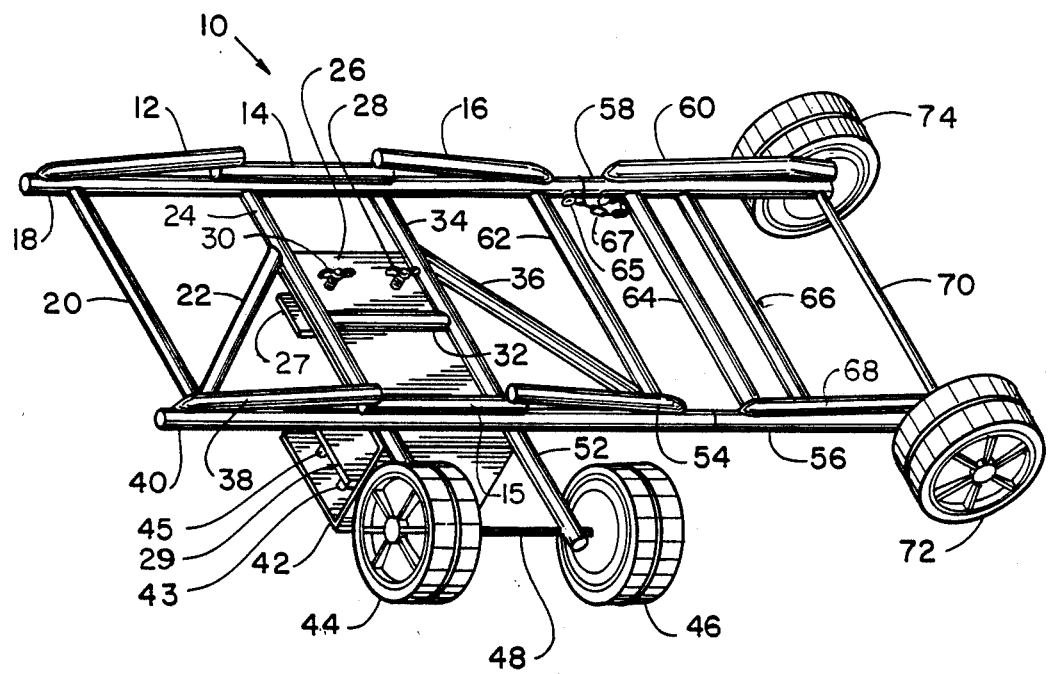
FIG. 1 is a perspective view of the boat dolly of the present invention.

With reference now to the drawings, and in particular to FIG. 1 thereof, a new and improved boat dolly embodying the principles and concepts of the present invention and generally designated by the reference numeral 10 will be described.

More specifically, it will be noted that the first embodiment 10 of the invention includes a plurality of connected support braces 12, 14 and 16. These support braces are connected by conventional means such as welding, riveting or threaded fasteners to a first side frame rail 18. A second, parallel side frame rail 40 has attached support braces 38, 15 and 54. Spaced parallel transverse support struts 20, 24, 34 and 62 extend between the side frame rails 18 and 40. A first diagonal brace 22 extends between the transverse support struts 20 and 24 and a second diagonal support brace 36 extends between the transverse support struts 34 and 62. A connecting brace 32 extends between the transverse support struts 24 and 34. A channel shaped mounting bracket 26 is secured to the transverse support braces 24 and 34, between the side frame rails 18 and 40. The mounting bracket 26 has a side portion 42 adapted to be received over the stern wall of a boat. A first rectangular adjustable mounting plate 27 is welded to a pair of adjustable swivel set screws 28 and 30 which extend through the mounting bracket 26, for engagement with the exterior outboard motor mount on a boat. A first pair of wheels 44 and 46 are mounted for rotation on an axle 48. A first wheel mount frame is formed by a pair of wheel support bars 50 and 52 which are end portions of the transverse support struts 24 and 34, respectively. In use, the first pair of wheels 44 and 46 are used to transport a boat in a horizontal orientation, with the boat inverted and supported by engagement of the outboard motor mount of the boat with the mounting bracket 26 of the dolly 10. A second pair of wheels 72 and 74 are mounted for rotation on an axle 70. A second wheel mount frame is formed by a pair of parallel frame rods 56 and 58 connected by transverse rods 64 and 66. A first wheel frame brace 60 extends generally parallel to the frame rod 58 and a second wheel frame brace 68 extends generally parallel to the frame rod 56. The wheel frame rods 58 and 56 are adapted to be removably received within the side frame rails 18 and 40 of the dolly frame 10. By this construction, the second pair of wheels 72 and 74 may be selectively attached at either end of the dolly frame 10, or may be removed entirely for transportation and storage purposes.

Figure 2:
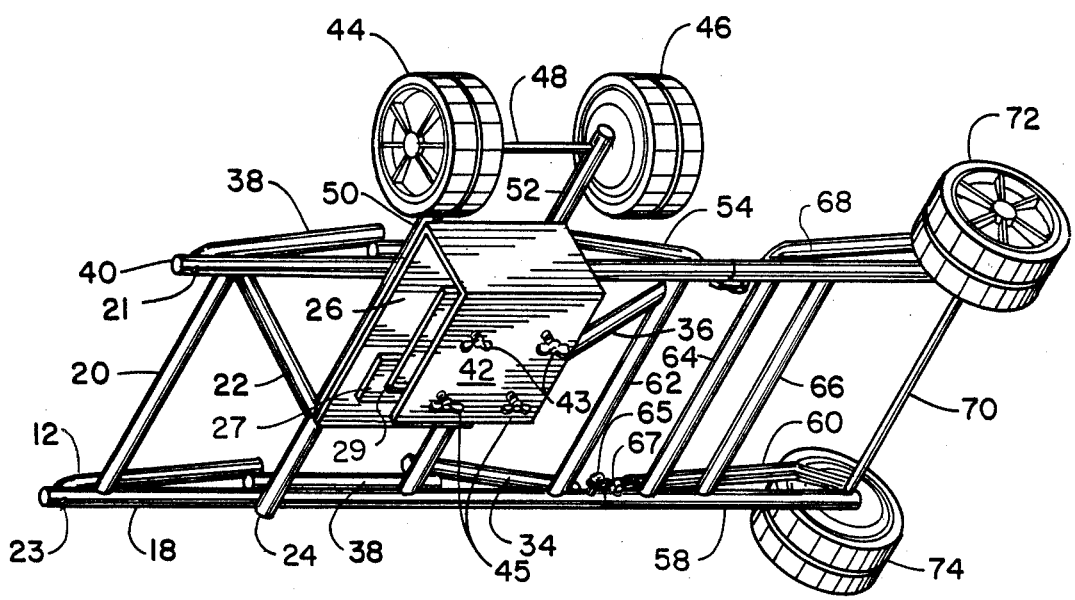
FIG. 2 is a perspective view of the opposite side of the boat dolly of the present invention.

With reference now to FIG. 2, a perspective view of the opposite side of the boat dolly 10 is illustrated. The mounting bracket side wall 42 supports a second rectangular adjustable mounting plate 29 which is welded to four adjustable swivel set screws 43 and 45 for engagement with the interior stern wall of a boat. It should be noted that while two swivel set screws 28 and 30 have been illustrated in conjunction with the mounting bracket 26 and first plate 27 (FIG. 1), and four swivel set screws 43 and 45 are shown in conjunction with mounting bracket side wall 42 and second plate 29, it is contemplated that as many swivel set screws as desired may be utilized in either of these locations. A first retaining pin 69 is attached by a small chain 71 to the wheel mount frame rod 56. (FIG. 5) The retaining pin 69 extends through aligned apertures in the frame rail 40 and wheel frame rod 56, thus securing these elements together in a telescoping arrangement. A second retaining pin 65 in conjunction with a chain 67 performs an identical function with respect to the wheel frame rod 58 and dolly side frame rail 18. A pair of apertures 21 and 23 are provided at opposite ends of the dolly side frame rails 18 and 40 for reception of the retaining pins 65 and 69. Thus, it may now be readily understood that the wheels 72 and 74 may be selectively positioned at either end of the dolly 10.

Figure 3:
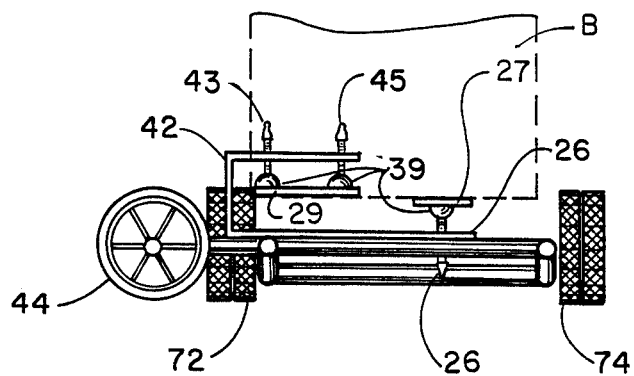
FIG. 3 is an end view of the boat dolly of the present invention.

With reference now to FIG. 3, an end view of the dolly 10 is provided. A portion of a boat B, mounted on the dolly 10, is shown in dotted lines. The stern end wall of the boat is received in the channel shaped mounting bracket 26, between the first 27 and second 29 adjustable mounting plates. Each of these swivel set screws 43, 45, 30 and 28 (FIG. 1) are provided with a swivel tip 39 which is welded to the associated plate 27 or 29. The surfaces of the plates 27 and 29 which face away from the attached set screw swivels 39 are surfaced with rubber or other adherent material for engagement with the outboard motor mount of the boat. This arrangement allows the boat dolly 10 of the present invention to adapt for use with any outboard motor mount, regardless of the angle thereof.

Figure 4:
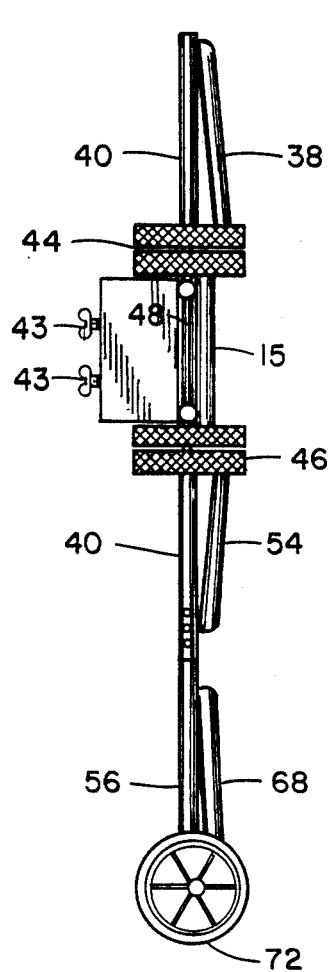
FIG. 4 is a side view of the boat dolly of the present invention.

In FIG. 4, a side view of the boat dolly 10 of the present invention is provided.

Figure 5:
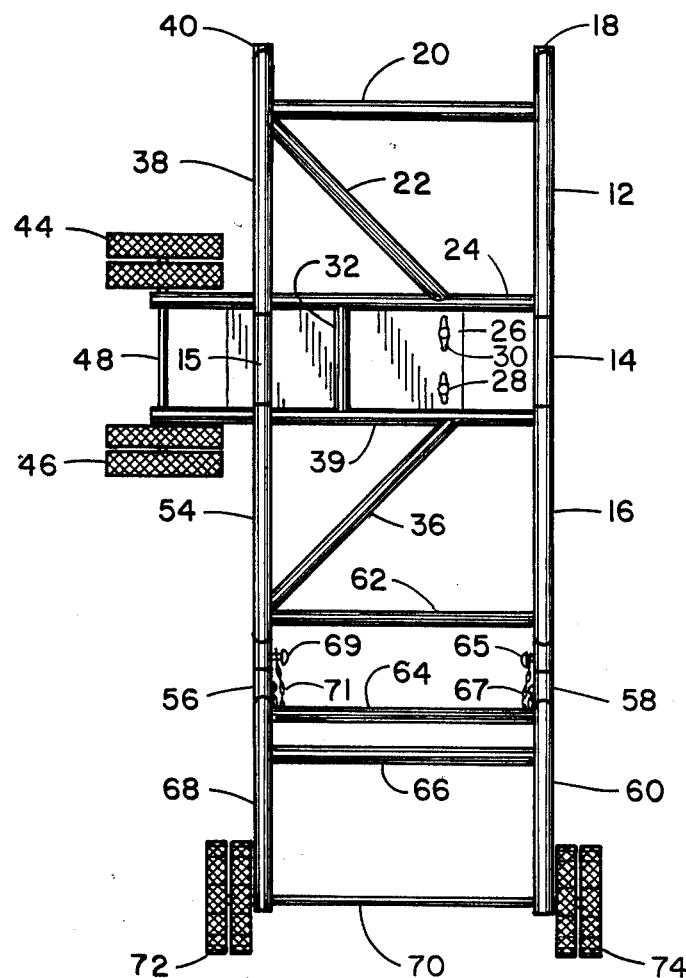
FIG. 5 is a top view of the boat dolly of the present invention.

In FIG. 5, a top view of the boat dolly 10 of the present invention is provided. It is contemplated that the various frame elements of the boat dolly 10 will be formed from a tubular metal material. Some of the frame braces may be omitted and a lighter weight achieved if a high strength alloy material is utilized, although this will add to the production costs. Even utilizing a relatively inexpensive metal conduit material, the weight of the boat dolly 10 of the present invention is approximately twenty five pounds. The boat dolly 10 of the present invention does away with the complexities of launching a non-trailered boat. Launching is accomplished simply by rolling the boat in an on edge vertical position into the water and turning it upright. The length of the wheel frame mounts 56 and 58 keeps the boat from getting any water inside. The entire launching can be accomplished by one person. After the boat is launched, the dolly is removed and stored in the boat or transportation vehicle until needed. The design of the boat dolly 10 of the present invention makes it very versatile in moving the boat around. Due to the fact the boat may be moved in a vertical position, the dolly 10 allows movement through any doors or gates large enough to accommodate a person and along narrow trails or openings to streams. As in the launching procedure, movement of the boat can be accomplished by one person. The boat dolly 10 makes it possible to store a boat in small spaces and where access to a storage space is limited. A boat stored on it's side with the dolly 10 attached occupies only two feet of stand up space. Through the use of the boat dolly 10 of the present invention, a boat can be stored in the average garage and still accommodate a vehicle, or in a side yard while still allowing room to walk past. The city dweller who lives in the apartment, condominium, mobile home park or any home without side access will now be able to conveniently store a boat.

With respect to the above description then, it is to be realized that the optimum dimensional relationships for the parts of the invention, to include variations in size, materials, shape, form function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved boat dolly, comprising:
   frame means;
   a first pair of wheels rotatably mounted on a side of said frame means;
   a second pair of wheels rotatably mounted on an end of said frame means;
   axes of rotation of said first and second pairs of wheels extending generally transversely; and
   means for selectively alternatively connecting said second pair of wheels to opposite ends of said frame means.

2. The boat dolly of claim 1, further comprising mounting bracket means on said frame means for attachment to an outboard motor mount of a boat.

3. The boat dolly of claim 2, wherein said mounting bracket means comprises a channel shaped bracket having threaded apertures engaged with a plurality of adjustable swivel set screws.

4. The boat dolly of claim 3, wherein said adjustable swivel set screws are received in threaded apertures formed through opposed side walls of said channel shaped bracket and are secured to first and second spaced adjustable mounting plates.

5. The boat dolly of claim 1, wherein said frame means comprises a pair of hollow tubular side frame rails connected by a plurality of hollow tubular transverse support struts.

6. The boat dolly of claim 5, further comprising detachable wheel frame means supporting said second pair of wheels, said wheel frame means comprising a pair of tubular frame rods adapted for telescoping engagement with said hollow tubular frame rails and support struts.

7. The boat dolly of claim 1, wherein said selective alternative connecting means comprises a pair of parallel tubular wheel frame bars rotatably mounting said second pair of wheels, and retaining pin means securing said pair of wheel frame bars in telescopic engagement with said frame means.

8. A new and improved boat dolly, comprising:
   a pair of spaced parallel hollow tubular side frame rails;
   a plurality of hollow tubular transverse support struts extending between said side frame rails;
   a channel shaped mounting bracket attached to said transverse support struts, between said side frame rails;
   a plurality of adjustable swivel set screws extending through opposed side walls of said mounting bracket;
   said set screws secured to first and second spaced adjustable mounting plates;
   a first pair of wheels rotatably mounted on said side frame;

a wheel mount frame having a pair of parallel tubular frame rods removably received in telescopic engagement with said pair of side frame rails;

a second pair of wheels rotatably mounted on said wheel mount frame;

axes of rotation of said first and second pairs of wheel extending generally transversely; and means for selectively alternatively securing said wheel mount frame at opposite ends of said side frame rails.

* * * * *